3,308,128
TETRAHYDRO-2-ISOQUINOLYLALKYL
DITHIOCARBAMATES
Richard A. Robinson, Evanston, Ill., assignor to G. D. Searle & Co., Chicago, Ill., a corporation of Delaware
No Drawing. Filed Jan. 29, 1964, Ser. No. 341,130
4 Claims. (Cl. 260—288)

The present invention relates to a group of dithiocarbamates containing the tetrahydroiosoquinolyl structure. More particularly, it relates to a group of compounds having the following general formula

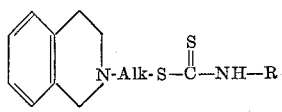

wherein Alk is a lower alkylene radical separating the atoms attached thereto by at least 2 carbon atoms; and R is selected from the group consisting of lower alkyl, phenyl, and benzyl.

The lower alkylene radicals referred to above contain up to 6 carbon atoms and can be exemplified by radicals such as ethylene, propylene, trimethylene, and tetramethylene. The lower alkyl radicals referred to above contain up to 6 carbon atoms and they are exemplified by radicals such as methyl, ethyl, propyl, and butyl.

The compounds of the present invention are conveniently prepared by reacting a 2-mercaptoalkyl-1,2,3,4-tetrahydroisoquinoline with the appropriate isothiocyanate. Various procedures are available for preparing the intermediate mercaptoalkyltetrahydroisoquinolines such as the reaction of 1,2,3,4-tetrahydroisoquinoline with a cyclic sulfide. A particularly useful procedure for the preparation for the mercaptoethyl compound is the reaction of 1,2,3,4-tetrahydroisoquinoline with ethylene monothiocarbonate.

The organic bases of this invention form nontoxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids.

The compounds of the present invention possess useful anti-biotic properties. Thus, they inhibit the growth of various organisms such as the bacteria *Diplococcus pneumoniae*, the protozoa *Tetrahymena gelleii*, and the alga *Chlorella vulgaris*, and they inhibit the germination of seeds of Trifolium.

The compounds which constitute this invention and their preparation will appear more fully from a consideration of the following examples which are given for the purpose of illustration only and are not to be construed as limiting the invention in spirit or in scope. In these examples, quantities are indicated in parts by weight and temperatures in degree centigrade (° C.).

Example 1

A mixture of 40 parts of 1,2,3,4-tetrahydroisoquinoline, 10 parts of ethylene monothiocarbonate and 350 parts of toluene is refluxed for 20 hours. The reaction mixture is then distilled at 15–20 mm. pressure to remove the toluene and unreacted 1,2,3,4-tetrahydroisoquinoline. The residue is dissolved in 350 parts of anhydrous ether and 10 parts of carbon disulfide is added to the resultant solution. The mixture is filtered to remove solid which precipitates and the filtrate is distilled to remove the ether and leave an oily residue of 2-(2-mercaptoethyl)-1,2,3,4-tetrahydroisoquinoline. This product is purified by distillation at 0.1–0.2 mm. pressure.

Example 2

A mixture of 5 parts of 2-(2-mercaptoethyl)-1,2,3,4-tetrahydroisoquinoline and 2.2 parts of methyl isothiocyanate in 20 parts of benzene is heated on a steam bath for about 5 minutes. 140 parts of anhydrous ether is added to the cold benzene solution to precipitate the product. The solid thus obtained is separated and dissolved in chloroform and excess hydrogen chloride as a solution in 2-propanol is added to the chloroform solution. The solid which precipitates is 2-(1,2,3,4-tetrahydro-2-isoquinolyl)ethyl methyldithiocarbamate hydrochloride and it melts at about 216–217° C. The free base of this compound has the following formula

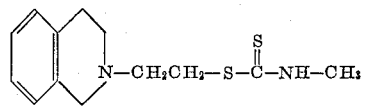

Example 3

If an equivalent quantity of ethyl isothiocyanate is substituted for the methyl isothiocyanate and the procedure of Example 2 is repeated, the product is 2-(1,2,3,4-tetrahydro-2-isoquinolyl)ethyl ethyldithiocarbamate hydrochloride.

Example 4

A solution of 5 parts of 2-(2-mercaptoethyl)-1,2,3,4-tetrahydroisoquinoline and 4 parts of phenyl isothiocyanate in 20 parts of benzene is heated on a steam bath for about 5 minutes. A solid precipitates from the reaction mixture on cooling. This is separated by filtration, dissolved in chloroform, and mixed with excess hydrogen chloride as a solution in 2-propanol. The solid which precipitates is 2-(1,2,3,4-tetrahydro-2-isoquinolyl)ethyl dithiocarbanilate hydrochloride and it melts at about 135° C. The free base of this compound has the following formula

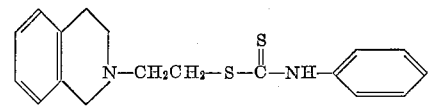

Example 5

If an equivalent quantity of benzyl isothiocyanate is substituted for the phenyl isothiocyanate and the procedure of Example 4 is repeated, the product obtained is 2-(1,2,3,4-tetrahydro-2-isoquinolyl)ethyl benzyldithiocarbamate hydrochloride.

What is claimed is:
1. A compound of the formula

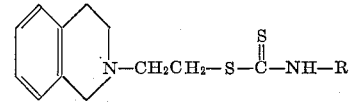

wherein R is selected from the group consisting of lower alkyl, phenyl, and benzyl.

2. A compound of the formula

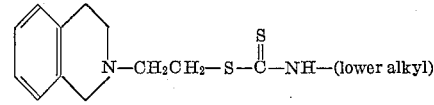

3. 2-(1,2,3,4,-tetrahydro-2-isoquinolyl)ethyl methyldithiocarbamate.

4. 2-(1,2,3,4-tetrahydro-2-isoquinolyl)ethyl dithiocarbanilate.

No references cited.

ALEX MAZEL, *Primary Examiner.*

D. G. DAUS, *Assistant Examiner.*